United States Patent [19]

Tamayama

[11] Patent Number: 5,179,485
[45] Date of Patent: Jan. 12, 1993

[54] OPTICAL ENCODER FOR DISC APPARATUS

[75] Inventor: Ryuzo Tamayama, Kanagawa, Japan

[73] Assignee: Sony Corporation, Tokyo, Japan

[21] Appl. No.: 460,754

[22] Filed: Jan. 4, 1990

[30] Foreign Application Priority Data

Jan. 11, 1989 [JP] Japan .................................. 1-5751

[51] Int. Cl.$^5$ .......................... G11B 5/55; G11B 21/08; G11B 5/596
[52] U.S. Cl. .................................. 360/106; 360/77.03; 360/77.04; 360/78.11
[58] Field of Search ................ 360/78.04, 78.08, 78.11, 360/77.01, 77.02, 77.03, 106

[56] References Cited

U.S. PATENT DOCUMENTS

| | | | |
|---|---|---|---|
| Re. 32,075 | 1/1986 | Harrison et al. | 360/77.04 |
| 4,396,959 | 8/1983 | Harrison et al. | 360/77.04 |
| 4,516,177 | 5/1985 | Moon et al. | 360/77.02 X |
| 4,590,527 | 5/1986 | Warner | 360/77.11 |
| 4,920,434 | 4/1990 | Brown et al. | 360/78.11 X |
| 4,974,109 | 11/1990 | Hoshimi et al. | 360/77.03 X |

Primary Examiner—John H. Wolff
Attorney, Agent, or Firm—Philip M. Shaw, Jr.

[57] ABSTRACT

An optical encoder for a disc apparatus having a head arm to record and reproduce a disc-shaped recording medium, a scale swung together with the head arm, a reticle and a light sensitive element disposed on one side of the scale, and a light emitting element disposed on the other side of the scale. The phases of slit patterns in the reticle and light receiving portions of the light sensitive element opposed thereto are each divided into halves, and the divided phases are distributed symmetrically on the opposite sides of the reticle center in the directions of swing motion of the scale. And the same distributed phases of the light receiving portions are individually connected to each other, thereby eliminating the phase deviation of the detection output that results from temperature fluctuation and so forth.

4 Claims, 5 Drawing Sheets

FIG. 8A
PRIOR ART
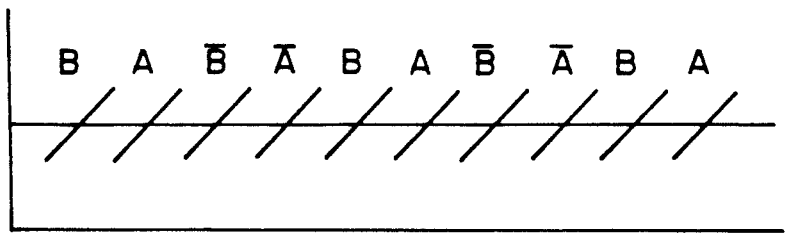
FIG. 8B
PRIOR ART
FIG. 8C
PRIOR ART
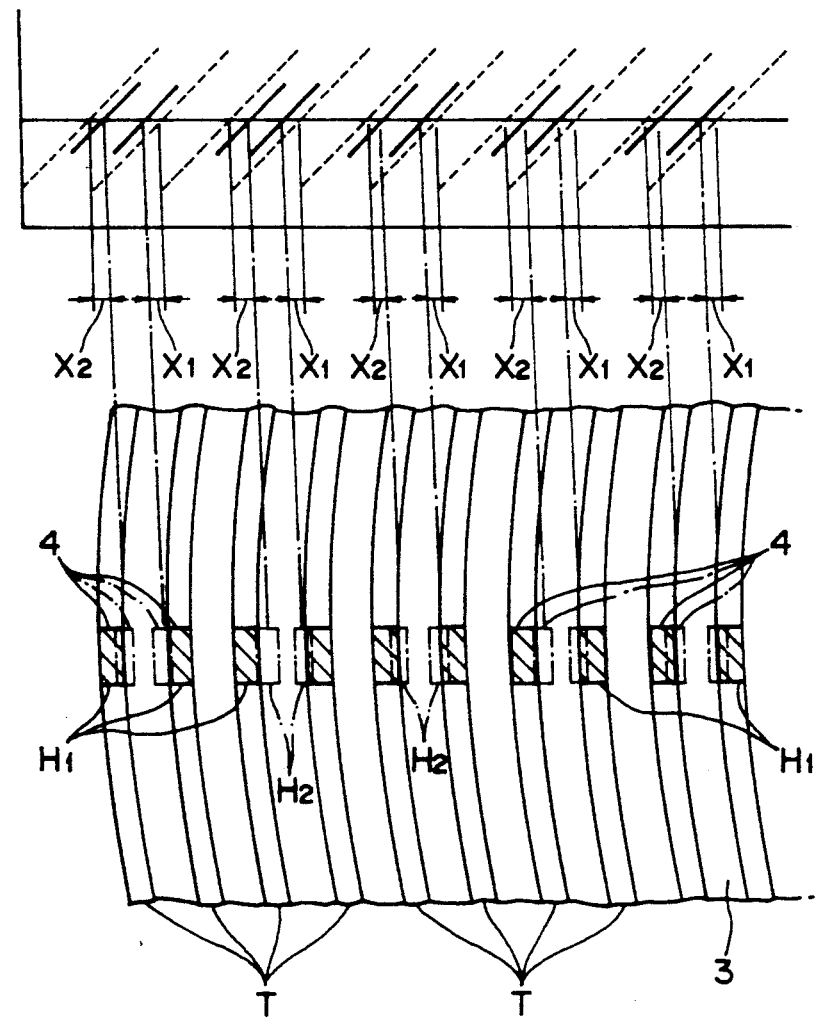

OPTICAL ENCODER FOR DISC APPARATUS

BACKGROUND OF THE INVENTION

1. Field of the Invention

The present invention relates to an optical encoder adapted for tracking control in a hard disc apparatus or the like.

2. Description of the Prior Art

Relative to the conventional hard disc apparatus known heretofore, there is an exemplary one disclosed in U.S. Pat. No. 4,396,959 and Reissue 32,075. In such known apparatus, as shown in FIGS. 5 and 6, a hard disc 3 serving as a recording medium is rotated in the direction of an arrow a by a turntable 2 disposed on a chassis 1 used also as a case, and simultaneously a head arm 5 furnished with a flying magnetic head 4 at its fore end is so driven by a voice coil motor 6 as to swing in the directions of arrows b and b' on an arm shaft 7, so that an operation of recording or reproducing the hard disc 3 is performed by means of the magnetic head 4.

An optical encoder 9 employed to execute tracking control in such hard disc apparatus comprises a scale 11 composed of a glass plate and attached to the head arm 5 firmly through a wing 10, a reticle 12 of a glass plate and a light sensitive element 13 such as a photo diode disposed in one lateral lower portion of the scale 11, and a light emitting element 14 such as a light emitting diode disposed in the other lateral upper portion of the scale 11. A sensor 15 is constituted of such reticle 12, light sensitive element 13 and light emitting element 14. And the sensor 15 is anchored onto the chassis 1 by the use of a support 16 composed of synthetic resin or the like.

In the conventional optical encoder 9, as illustrated in FIG. 7, a multiplicity of slit patterns 11a formed in the scale 11 are arrayed radially with respect to the center 7a of the arm shaft 7 in a manner to be arcuate around the center 7a, and four slit patterns 12a each composed of a plurality of slit groups and formed in the reticle 12 are also arrayed radially with respect to the center 7a of the arm shaft 7 in a manner to be arcuate around the center 7a. And four light receiving portions (not shown) of the light sensitive element 13 are disposed under the four slit patterns 12a in the reticle 12.

For simplifying positional alignment of the scale 11 and the reticle 12, it has been customary that the phases of pairs of the slit patterns 12a in the reticle 12, i.e., a total of four phases A, $\overline{A}$ and B, e,ovs/B/ are arranged linearly on the two sides of the reticle center P (the central position of the reticle 12 in the swing directions b, b' of the scale 11 and on a radial line passing through the center 7a of the arm shaft 7 as illustrated in FIG. 5).

The light irradiated from the light emitting element 14 and passed through the slit patterns 11a in the scale 11 is passed sequentially through the slit patterns 12a in the reticle 12 and then is detected (sensed) by the light receiving portions of the light sensitive element 13. In this stage of the operation, if the scale 11 is in its motion in the direction of the arrow b for example, detection outputs of four phases in the order of B-A-$\overline{B}$-$\overline{A}$ are obtained sequentially as shown in FIG. 8A. And tracking control is executed in accordance with such four-phase detection outputs to obtain a just track position $H_1$ of the magnetic head 4 relative to the four tracks T on the hard disc 3, as represented by oblique lines in FIG. 8C.

However, there exists a disadvantage in the prior art that thermal off-track is error is prone to occur in case the reticle 12 and the light sensitive element 13 integral therewith are positionally deviated, because of temperature fluctuation from normal temperature to any higher point, with respect to the scale 11 in the direction of y-axis shown in FIGS. 5 through 7.

That is, due to the positional deviation of the reticle 12 in the y-axis direction, the four phases A, and B, $\overline{B}$ of the slit patterns 12a in the reticle 12 are shifted along the y-axis from the proper positions represented by solid lines in FIG. 7 to the positions represented by dotted lines, whereby one pair of phases A, $\overline{A}$ on the left side of the reticle center P are varied to have a positional deviation $X_1$ in the direction of the arrow b', and another pair of phases B, $\overline{B}$ on the right side of the reticle center P are varied to have a positional deviation $X_2$ in the direction of the arrow b.

Consequently, regarding the phases of the slit patterns 12a in the reticle 12 with respect to the slit patterns 11a in the scale 11 during the displacement of the scale 11 in the direction of the arrow b, a lead occurs in one pair of phases A, $\overline{A}$ on the left side of the reticle center P, while a lag occurs in another pair of phases B, $\overline{B}$ on the right side of the reticle center P. As a result, phase deviations are caused in the entirety of the four detection outputs B, A, $\overline{B}$, $\overline{A}$ in such a manner that, as represented by solid lines in FIG. 8B, the phases B, A and $\overline{B}$, $\overline{A}$ of the detection outputs mutually approach while the phases A, $\overline{B}$ and $\overline{A}$, B mutually recede. Thus, as represented by one-dot chain lines in FIG. 8C, a track pitch error $H_2$ is induced in the magnetic head 4 with respect to each of the entire four tracks T on the hard disc 3.

For the purpose of solving such a problem, it has been necessary heretofore to perform phase adjustment among the individual phases of the detection outputs by the use of four offset control rheostats and four gain control rheostats for the four phases of the slit patterns 12a in the reticle 12. Accordingly, another problem is existent that a total of eight control rheostats are needed on the light receiving side of the sensor 15.

OBJECT AND SUMMARY OF THE INVENTION

It is therefore an object of the present invention to provide an improved optical encoder capable of eliminating, in a disc apparatus, any phase deviation of the detection output that may result from temperature fluctuation and so forth.

For achieving the object mentioned, the optical encoder of the present invention is so contrived that the respective phases of a plurality of slit patterns in a reticle and a plurality of light receiving portions of a light sensitive element opposed to such slit patterns to form pairs are each divided into halves, and the phases thus divided are distributed symmetrically to the two sides of the reticle center in the directions of the swing motion of a scale. And the distributed phases of each light receiving portion are connected to each other. Consequently, a combined output including both the lead and the lag of the divided phases on the two sides of the reticle center can be obtained as a detection output of each phase, hence eliminating the phase deviation of the detection output that results from temperature fluctuation and other variations.

BRIEF DESCRIPTION OF THE DRAWINGS

FIGS. 8A, 8B and 8C illustrate phase deviations of detection outputs and tracking in a conventional example.

DESCRIPTION OF THE PREFERRED EMBODIMENTS

Figure 1:
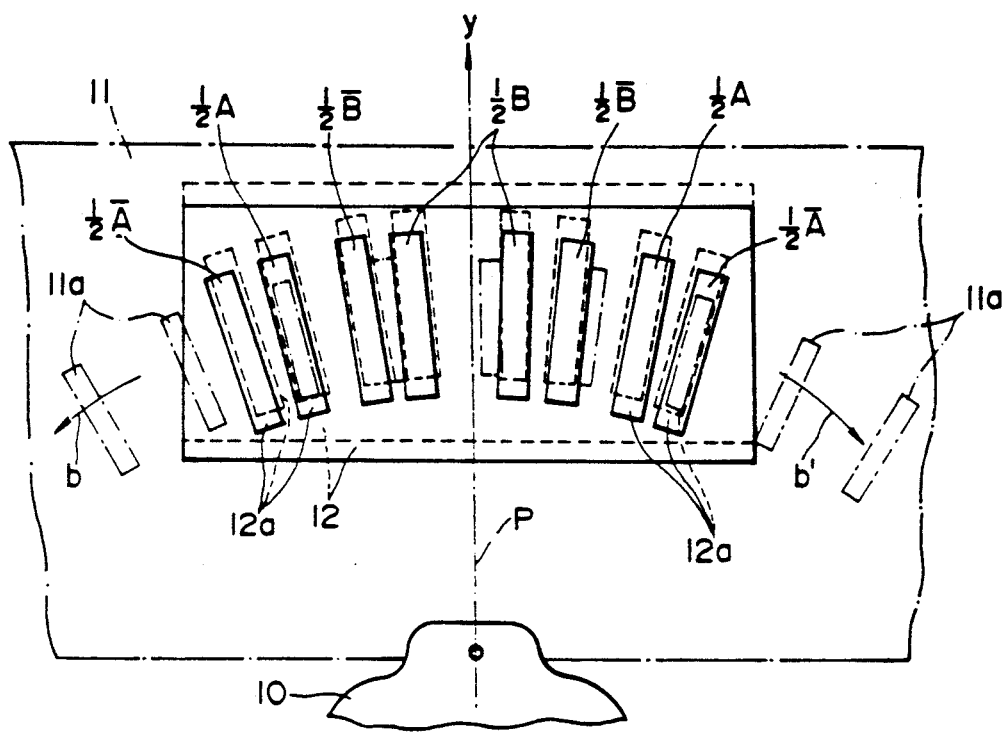
FIG. 1 is a plan view of a reticle used in an exemplary embodiment of the present invention.

Hereinafter an exemplary embodiment of the optical encoder of the present invention employed in a hard disc apparatus will be described with reference to FIGS. 1 through 4. In these diagrams, the same component elements as those used in the aforementioned conventional example of FIGS. 5 through 8C are denoted by the same reference numerals and symbols, and a repeated explanation thereof is omitted here.

Figure 2:
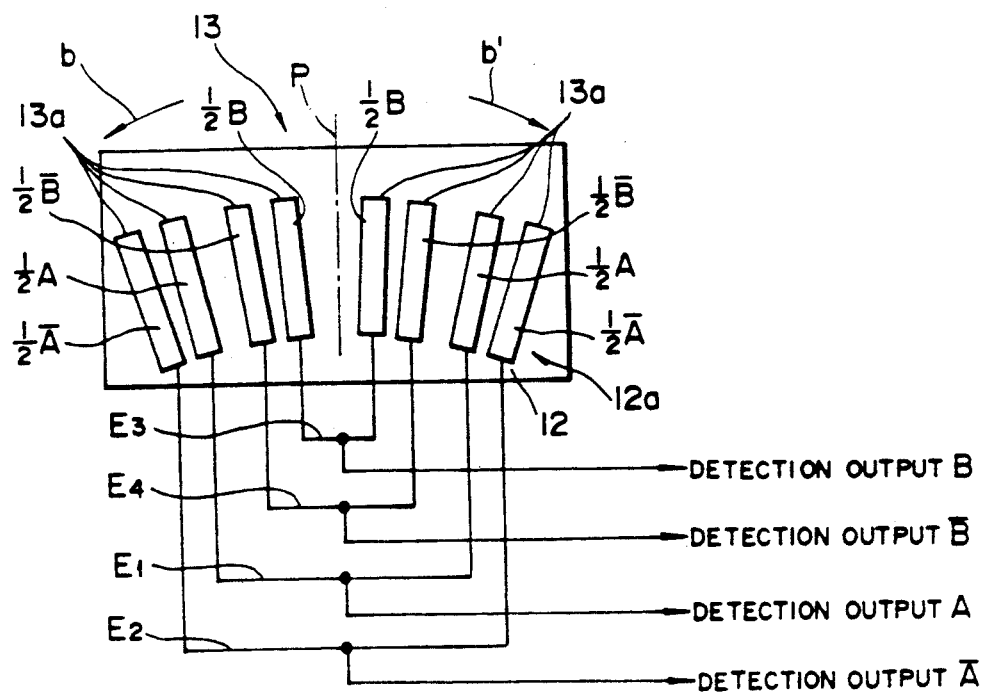
FIG. 2 is a plan view of a light sensitive element in the embodiment.

In an optical encoder 9 of the present invention, as shown in FIGS. 1 and 2, a total of four phases A, $\bar{A}$ and B, $\bar{B}$ of four slit patterns 12a in a reticle 12 and four light receiving portions 13a of a light sensitive element 13 opposed to such slit patterns 12a to form pairs are each divided into halves to obtain a total of eight phases ½ A, ½ $\bar{A}$ and ½ B, ½ $\bar{B}$. Such eight divided phases are distributed symmetrically to the two sides of the reticle center P in the directions of arrows b and b' indicating the swing motion of a scale 11. And in the light receiving portions 13a of the light sensitive element 13, as shown in FIG. 2, the eight divided phases ½ A, ½ $\bar{A}$ and ½ B, ½ $\bar{B}$ distributed to the two sides of the reticle center P are so connected mutually as to become the former four phases by means of electric wires $E_1$, $E_2$, $E_3$, $E_4$.

Consequently, according to the optical encoder 9 of the present invention, detection outputs of the four phases A, $\bar{A}$ and B, $\bar{B}$ can be obtained from the combined outputs of a total of eight divided phases ½ A, ½ $\bar{A}$ and ½ B, ½ $\bar{B}$ distributed to the two sides of the reticle center P.

Figure 3:
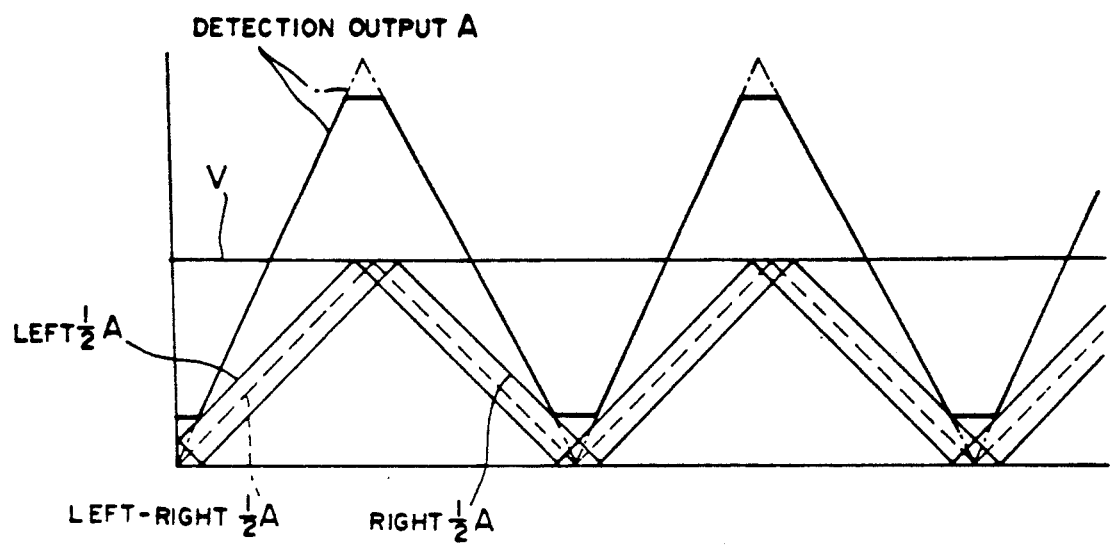
FIG. 3 graphically shows the waveform of a detection output obtained in the embodiment.

For example, during the displacement of the slit patterns 11a of the scale 11 to the reticle 12 in the direction of an arrow b in FIG. 1, there exists no phase deviation at all in a normal temperature state between the phase A and the phase B, so that a regular detection output A of a triangular waveform represented by a one-dot chain line in FIG. 3 is obtained from the combined output composed of a right output ½ A and a left output ½ A on the two sides of the reticle center P represented by a dotted line in FIG. 2.

However, in a higher temperature state, the reticle 12 is positionally deviated along the y-axis represented by a dotted line in FIG. 1, so that the phase of the output ½ A on the right side of the reticle center P comes to have a lead to the phase B as represented by a thin line in FIG. 3, while the phase of the output ½ A on the left side comes to have a lag. The combined output of such right output ½ A and left output ½ A is shaped to have a trapezoidal waveform as represented by a solid line in FIG. 2, whereby a sufficiently great detection output A can be obtained in comparison with the reference voltage V of detection output. Consequently it becomes possible to eliminate the phase deviation of the detection output that results from temperature fluctuation or the like, hence preventing thermal off-track and so forth.

Furthermore, due to the nonnecessity of phase adjustment among the individual phases of the detection outputs, a single offset control rheostat and a single gain control rheostat are adequate to meet the requirements for the four phases A, $\bar{A}$ and B, $\bar{B}$ of the slit patterns 12a in the reticle 12.

Figure 4:
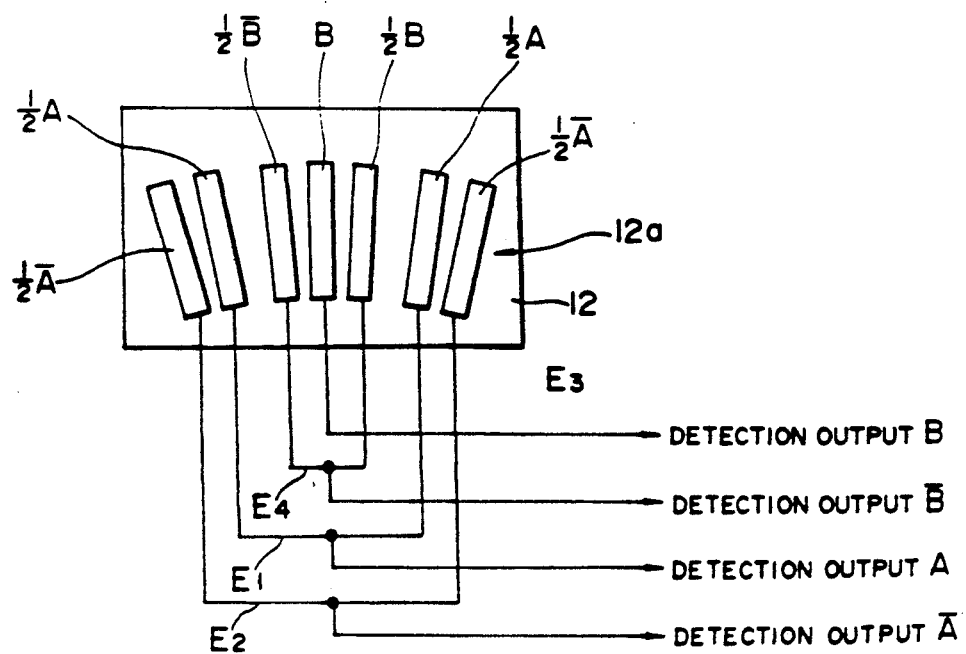
FIG. 4 is a plan view of a modified embodiment of the invention.
Figure 5:
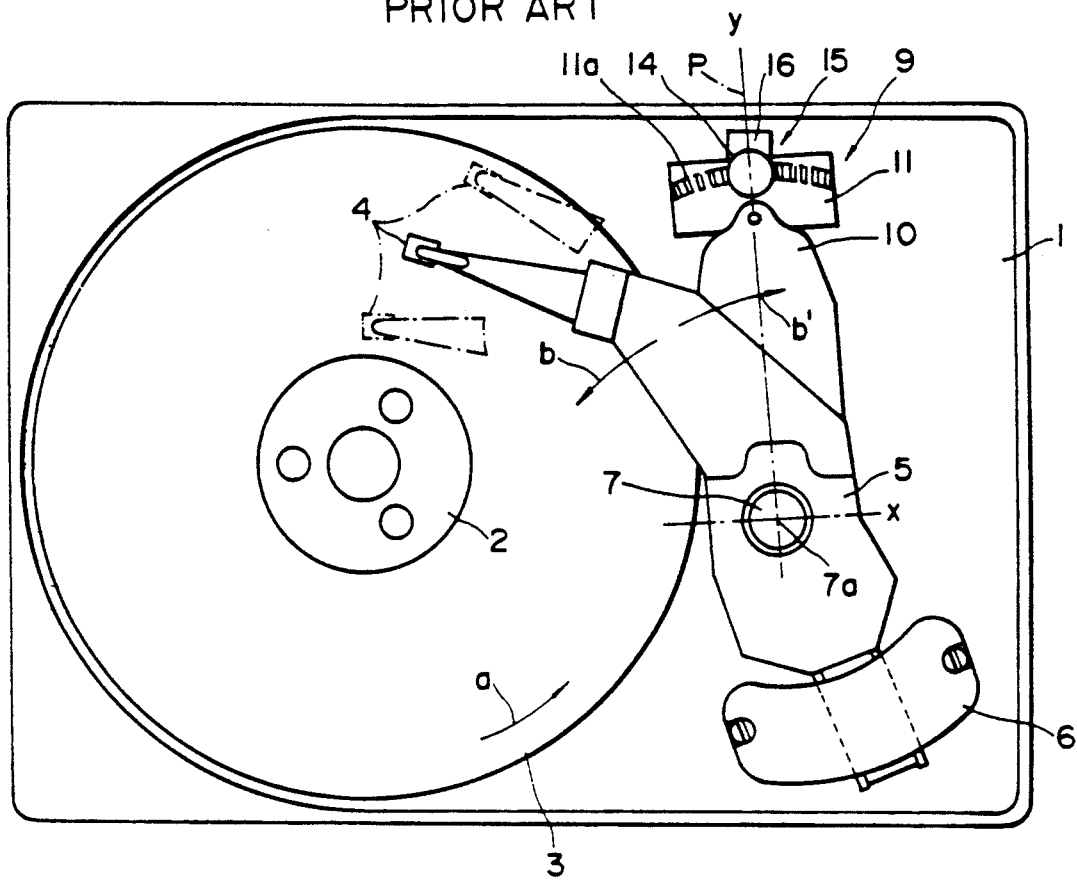
FIG. 5 is a plan view of a conventional hard disc apparatus.
Figure 6:
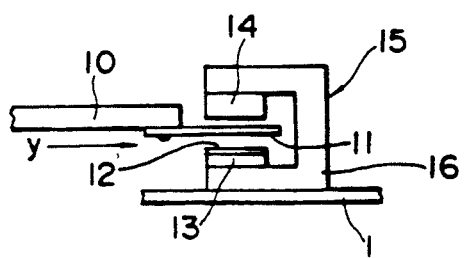
FIG. 6 is a side view of an optical encoder employed in the hard disc apparatus of FIG. 5.
Figure 7:
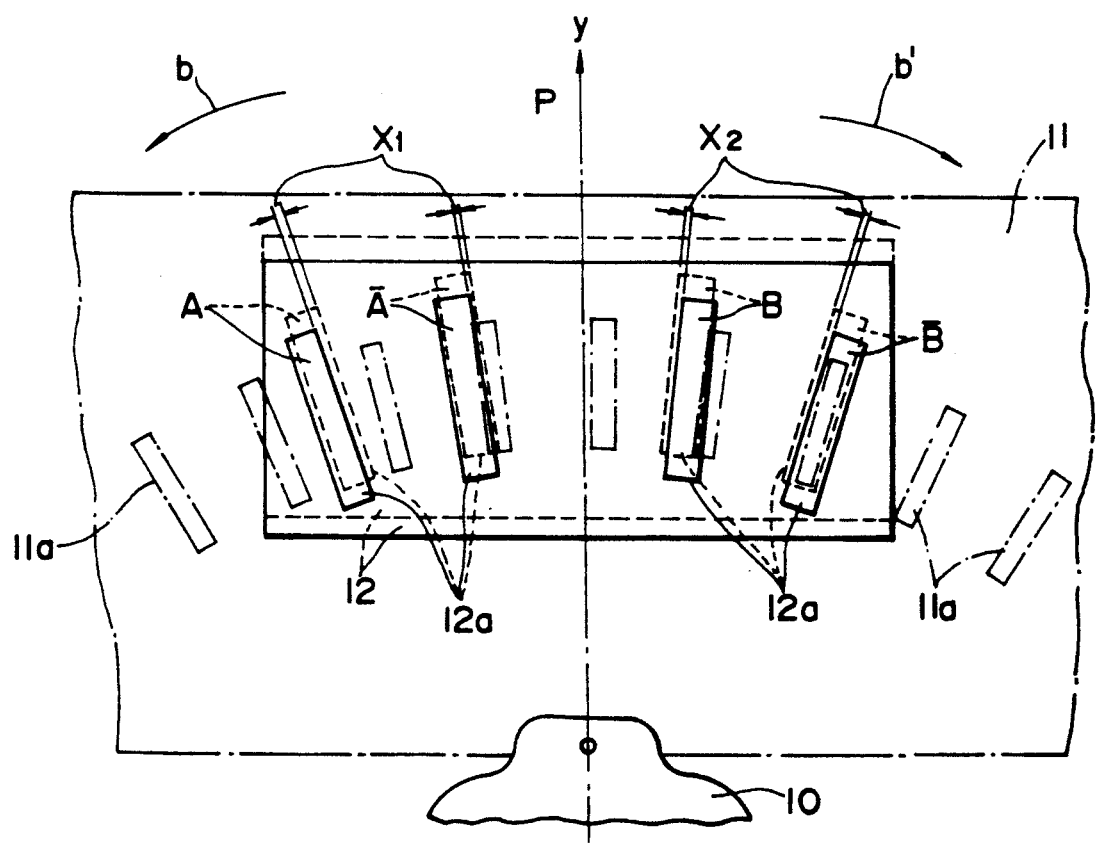
FIG. 7 is a plan view of a conventional reticle.

FIG. 4 shows a modified embodiment wherein, for example, the divided left and right phases ½ B are formed into one phase B on the reticle center P, and the entirety is composed of a total of seven phases, i.e., individual pairs of the divided phases ½ A, ½ $\bar{A}$, ½ $\bar{B}$ and one phase B. The same effect as the aforementioned can be attained by such modified constitution as well.

It is to be understood that the present invention is not limited to the above embodiment alone, and a variety of effective modifications may be contrived on the basis of the technical concept of the present invention.

It is further to be noted that application of the present invention is not restricted merely to an optical encoder for a hard disc apparatus alone, and it may be applied also to an optical encoder for any of various disc apparatus using a disc-shaped recording medium.

Owing to the constitution of the present invention mentioned, the following advantageous effects are achievable.

Firstly, any phase deviation of the detection output resulting from temperature fluctuation and so forth can be eliminated to consequently prevent occurrence of a thermal off-track fault.

And secondly, since it is possible to eliminate the phase deviation of the detection output resulting from temperature fluctuation and so forth, there exists no necessity of phase control among the individual phases of the detection outputs, thereby enabling a single offset control rheostat and a single gain control rheostat to perform the desired adjustments for the entire four phases of the slit patterns in the reticle, so that the number of control rheostats needed on the light receiving side of the photo sensor can be widely reduced from the conventional eight to two in the present invention.

What is claimed is:

1. An optical encoder for detecting the position of a magnetic head in a disc apparatus which includes:
    a magnetic head;
    a rotatable, disc shaped recording medium;
    an arm shaft on which the magnetic head is mounted and which is rotatable about an axis parallel to the rotational axis of the disc shaped recording medium, for swinging the magnetic head through an arc radially with respect to the disc-shaped recording medium;
    the optical encoder being of the type which includes:
        a scale having a multiplicity of slits and mounted on the arm shaft so as to be swung through the same arc as the magnetic head;
        a light sensitive element;
        a reticle disposed on one side of the scale, between the scale and the light sensitive element, the reticle having a center which is intersected by a hypothetical line passing through the rotational axis of the arm shaft; and
        a light emitting element disposed on the other side of the scale at a position opposite to the light sensitive element;

wherein the improvement resides in the optical encoder which comprises:
- a pair of slits formed in the reticle symmetrically on the opposite sides of the reticle center;
- a pair of light sensing portions, each producing a separate output signal, and arranged in the light sensitive element symmetrically on the opposite sides of the reticle center in a manner to be respectively opposed to the pair of slits in the reticle; and
- summing means connected to the pair of light sensing portions for adding their output signals together to produce a single phase head position output signal whose phase does not deviate with changes in the ambient temperature.

2. An optical encoder according to claim 1, wherein a plurality of pairs of the slits are formed in the reticle and a plurality of pairs of the light sensing portions are arranged in the light sensitive element to be respectively opposed to the pairs of slits, the pairs of slits and the corresponding, opposing pairs of light sensing portions thereby forming paired groups, each paired group having a different phase with respect to the scale, and the summing means separately sums the signals obtained from each pair of the light sensing portion to produce separate output signals, each having a different phase.

3. An optical encoder for positioning a transducer head relative to a recording disk in a disk drive, comprising:
- a moveable scale attached to the transducer head arm shaft and having a multiplicity of slits;
- the arm shaft for swinging the scale about a rotational axis;
- a light sensitive element;
- a reticle disposed on one side of the scale; and
- a light emitting element disposed on the other side of the scale at a position opposite to the light sensitive element;
- a pair of slits formed in the reticle symmetrically on opposite sides of a hypothetical reticle center line which bisects the reticle and passes through the rotational axis of the arm shaft;
- a pair of light sensing portions, each producing a separate output signal, and arranged in the light sensitive element symmetrically on opposite sides of the hypothetical reticle center line in a manner to be respectively opposed to the pair of slits in the reticle; and
- summing means connected to the pair of light sensing portions for adding their output signals together to produce a single phase output signal representing the position of the transducer head relative to the recording disk, the output signal having a phase which does not deviate with changes in the ambient temperature.

4. An optical encoder according to claim 3, wherein a plurality of pairs of the slits are formed in the reticle and a plurality of pairs of the light sensing portions are arranged in the light sensitive element to be respectively opposed to the pairs of slits, the pairs of slits and the corresponding, opposing pairs of light sensing portions thereby forming paired groups, each paired group having a different phase with respect to the scale, and the summing means separately sums the signals obtained from each pair of the light sensing portion to produce separate output signals, each having a different phase.

* * * * *